United States Patent
Hunt et al.

(10) Patent No.: US 9,819,209 B2
(45) Date of Patent: Nov. 14, 2017

(54) CONTACTLESS CHARGING OF BLUETOOTH OTHER WIRELESS HEADSETS

(75) Inventors: Steven E. Hunt, San Jose, CA (US); Mathew Jacob, Fremont, CA (US)

(73) Assignee: TEXAS INSTRUMENT INCORPORATED, Dallas, TX (US)

( * ) Notice: Subject to any disclaimer, the term of this patent is extended or adjusted under 35 U.S.C. 154(b) by 1068 days.

(21) Appl. No.: 13/353,145

(22) Filed: Jan. 18, 2012

(65) Prior Publication Data
US 2012/0181855 A1 Jul. 19, 2012

Related U.S. Application Data

(60) Provisional application No. 61/433,767, filed on Jan. 18, 2011.

(51) Int. Cl.
| | |
|---|---|
| *B60L 1/00* | (2006.01) |
| *B60L 3/00* | (2006.01) |
| *H02G 3/00* | (2006.01) |
| *H02J 7/02* | (2016.01) |
| *H02J 7/00* | (2006.01) |
| *H01F 38/14* | (2006.01) |

(52) U.S. Cl.
CPC ............ *H02J 7/025* (2013.01); *H02J 7/00* (2013.01); *H02J 7/0044* (2013.01); *H01F 38/14* (2013.01)

(58) Field of Classification Search
CPC . Y02T 10/7005; Y02T 10/7077; B60R 16/03; B60R 11/14; B60R 16/0315; H02J 7/00; H02J 7/025; H02J 17/00
USPC .... 307/9.1, 10.1–10.6, 104, 149, 66, 64, 43; 320/108, 109; 455/41.2; 379/420.01
See application file for complete search history.

(56) References Cited

U.S. PATENT DOCUMENTS

| | | | |
|---|---|---|---|
| 5,157,319 A | 10/1992 | Klontz et al. | |
| 6,184,651 B1 | 2/2001 | Fernandez et al. | |
| 2002/0197911 A1* | 12/2002 | Holmes | H04M 1/6091 439/638 |
| 2005/0286716 A1* | 12/2005 | Hou | H02J 7/0055 379/430 |
| 2007/0273327 A1* | 11/2007 | Daniel | H01M 2/105 320/110 |
| 2010/0066305 A1* | 3/2010 | Takahashi | H01M 10/44 320/108 |
| 2010/0201189 A1* | 8/2010 | Kirby | H04B 5/0037 307/9.1 |
| 2010/0277119 A1* | 11/2010 | Montague | A61B 5/0002 320/107 |
| 2010/0310107 A1* | 12/2010 | Saila | H04M 1/05 381/363 |
| 2010/0323619 A1* | 12/2010 | Arndt | 455/41.2 |
| 2011/0050164 A1* | 3/2011 | Partovi | H01F 5/003 320/108 |

(Continued)

*Primary Examiner* — Rexford Barnie
*Assistant Examiner* — Jagdeep Dhillon
(74) *Attorney, Agent, or Firm* — Andrew Viger; Charles A. Brill; Frank D. Cimino (57) ABSTRACT

An apparatus includes an adapter having a charging unit defining a space configured to receive a wireless headset. The charging unit includes transmit circuitry configured to wirelessly transmit power to the wireless headset when the wireless headset is inserted into the space of the charging unit. At least a portion of the adapter is configured to be inserted into an auxiliary or accessory power socket of a vehicle. The power socket could represent a cigarette lighter holster.

10 Claims, 7 Drawing Sheets

(56) References Cited

U.S. PATENT DOCUMENTS

2011/0115429 A1* 5/2011 Toivola .................. H01F 38/14
  320/108
2011/0227527 A1* 9/2011 Zhu ....................... H02J 7/0044
  320/108

* cited by examiner

CONTACTLESS CHARGING OF BLUETOOTH OTHER WIRELESS HEADSETS

CROSS-REFERENCE TO RELATED APPLICATION AND PRIORITY CLAIM

This application claims priority under 35 U.S.C. §119(e) to U.S. Provisional Patent Application No. 61/433,767 filed on Jan. 18, 2011, which is hereby incorporated by reference.

TECHNICAL FIELD

This disclosure relates generally to wireless headsets. More specifically, this disclosure relates to devices and systems supporting contactless charging of BLUETOOTH headsets and other wireless headsets.

BACKGROUND

Many mobile telephones support communications with wireless headsets that allow users to talk and listen during telephone calls without holding the mobile telephones next to their heads. These wireless headsets are typically BLUETOOTH devices, which use the BLUETOOTH protocol to support wireless communications between the wireless headsets and the mobile telephones. These wireless headsets usually include internal power supplies that need to be recharged from time to time.

BRIEF DESCRIPTION OF DRAWINGS

For a more complete understanding of this disclosure and its features, reference is now made to the following description, taken in conjunction with the accompanying drawings, in which.

DETAILED DESCRIPTION

FIG. 1 through 9B, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

This disclosure provides various contactless charging devices and systems for charging BLUETOOTH headsets and other wireless headsets. A charging scheme is "contactless" when power is transferred wirelessly between two components. In some embodiments, a receive module (often called a "dongle") containing circuitry for wirelessly receiving power can be physically coupled to a wireless headset. In other embodiments, a wireless headset itself contains circuitry for wirelessly receiving power.

Figure 1:
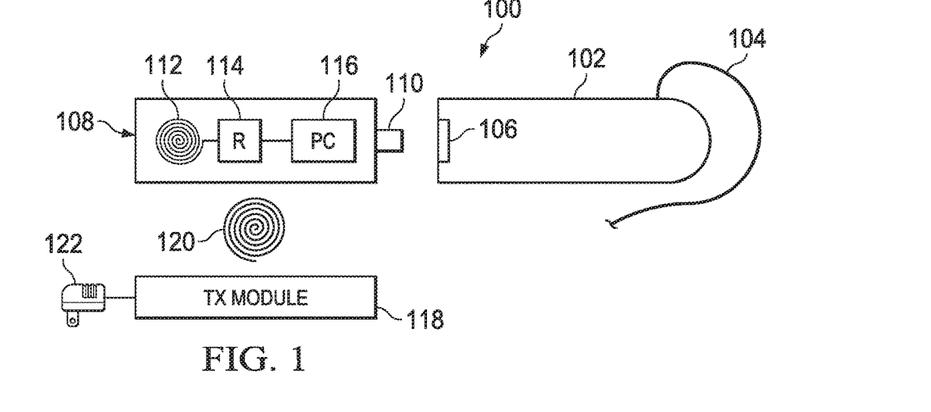
FIG. 1 illustrates an example system for charging a wireless headset using a headset dongle in accordance with this disclosure.

FIG. 1 illustrates an example system 100 for charging a wireless headset using a headset dongle in accordance with this disclosure. As shown in FIG. 1, the system 100 includes a wireless headset 102, which supports wireless communications with a mobile telephone or other external device or system. For example, the wireless headset 102 could include a wireless transceiver supporting a BLUETOOTH protocol or other protocol. The wireless headset 102 could also include a microphone for capturing a user's voice or other audio signals and a speaker for playing audio signals to the user. Among other things, these components can support voice telephone communications through the mobile telephone or other device. The wireless headset 102 represents any suitable wireless headset device, such as a BLUETOOTH headset. Note, however, that any other suitable wireless protocol could be used.

The wireless headset 102 could have any suitable size, shape, form factor, and dimensions. In this example, the wireless headset 102 includes an ear loop 104, which loops over a user's ear to hold the wireless headset 102 in place. The use of the ear loop 104 is optional, and other mechanisms could be used to help secure the wireless headset 102 in place. The wireless headset 102 also includes at least one port 106, which represents any suitable structure for physically coupling the wireless headset 102 to an external device. The port 106 could, for instance, represent a micro-USE or "μUSB" port.

In this example, a receive module 108 can be coupled to the wireless headset 102 via a connector 110, which could be inserted into the port 106. The receive module 108 includes circuitry for wirelessly receiving power from an external source and providing the received power to the wireless headset 102. For example, the receive module 108 could include at least one receive coil 112 (a coil of conductive material) that can receive power transferred through inductive coupling. The receive module 108 could also include at least one rectifier (R) 114 and power conditioning circuitry (PC) 116 for rectifying and conditioning the received power, such as to generate a direct current (DC) voltage at a specified level. The DC voltage or other received power could then be used in any suitable manner, such as to recharge an internal power supply in the headset 102.

The receive module 108 includes any suitable structure for wirelessly receiving power from an external source and providing the received power to a wireless headset. The connector 110 includes any suitable structure for coupling the receive module 108 to the wireless headset, such as a μUSB connector.

A transmit module 118 provides power to the receive module 108, such as by generating a magnetic field, 120 that inductively couples power from the transmit module 118 to the receive module 108. The transmit module 118 includes any suitable structure for wirelessly transferring power, such as at least one transmit coil.

Power is provided to the transmit module 118 by an external power source 122. In this example, the power source 122 represents an alternating current (AC) adapter that can convert AC power into DC power (such as +5V DC). In particular embodiments, the AC adapter could represent an adapter designed to charge the wireless headset 102 directly, such as by inserting a connector of the AC adapter into the port 106. In this case, the transmit module 118 can be designed to receive the same connector from the power source 122. However, any other suitable AC adapter or other power source 122 could be used here, such as a DC battery (like the battery in a car or other vehicle) or a DC-to-DC converter.

In the embodiment shown in FIG. 1, the receive module 108 could represent a dongle that can be temporarily attached to the wireless headset 102, and the connected devices can be placed on or near the transmit module 118. Power wirelessly provided by the transmit module 118 is received by the dongle, which provides the power to the wireless headset 102 in order to charge the headset 102 or otherwise power the wireless headset 102.

Figure 2A:
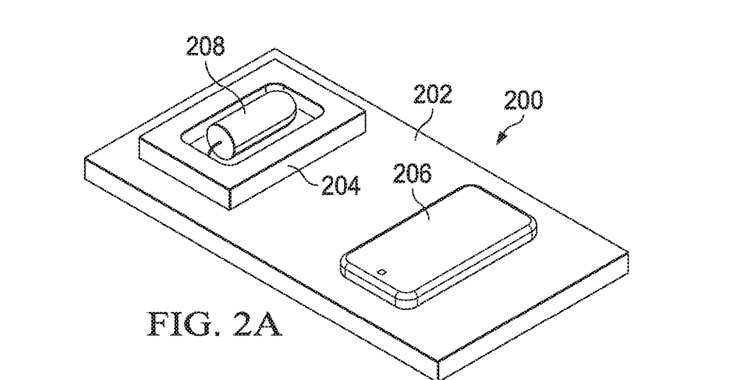
FIGS. 2A through 2D illustrate an example system for charging a wireless headset using a dual-charging approach in accordance with this disclosure.

FIGS. 2A through 2D illustrate an example system 200 for charging a wireless headset using a dual-charging approach in accordance with this disclosure. As shown in FIG. 2A, the system 200 includes a transmit module 202 and a receive module 204, which can be placed on the transmit module 202. The transmit module 202 is able to inductively couple power to a mobile device 206 and a wireless headset 208 via the receive module 204. The wireless headset 208 is coupled to the receive module 204 here so that power received by the receive module 204 can be provided to the wireless headset 208. The mobile device 206 could represent any device that can receive power wirelessly (either itself or using an external dongle). In particular embodiments, the mobile device 206 represents a mobile telephone that is paired to the wireless headset 208. Note that power can be supplied individually or simultaneously to these components 206-208.

Figure 2B:
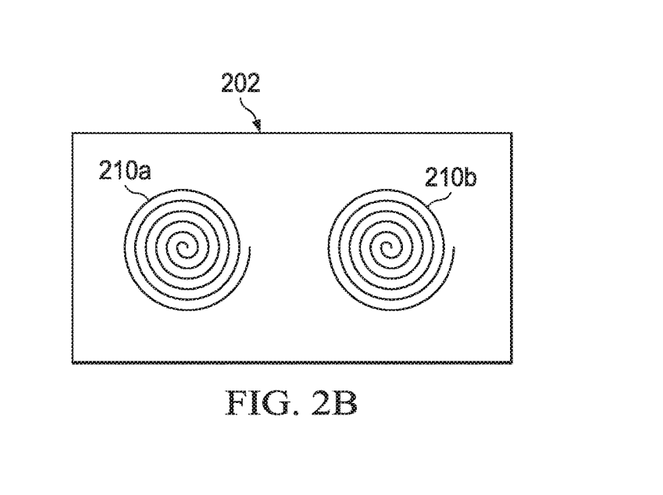

FIG. 2B represents an example embodiment of the transmit module 202, which includes multiple coils 210*a*-210*b* for inductively coupling power to one or more external devices. However, one or more than two coils could be used, and each coil 210*a*-210*b* could have any suitable size, shape, and orientation. Power can be provided to the transmit module 202 from any suitable source. For instance, the transmit module 202 could be coupled to an AC adapter to receive power from a standard wall outlet. The transmit module 202 could also be coupled to a cigarette lighter or other power outlet in a vehicle, or the transmit module 202 could be wired into the battery or other power supply of the vehicle. In the example shown in FIG. 2A, power is inductively coupled from the transmit module 202 to the receive module 204 using the coil 210*a*, and power is inductively coupled from the transmit module 202 to the mobile device 206 using the coil 210*b*.

Figure 2C:
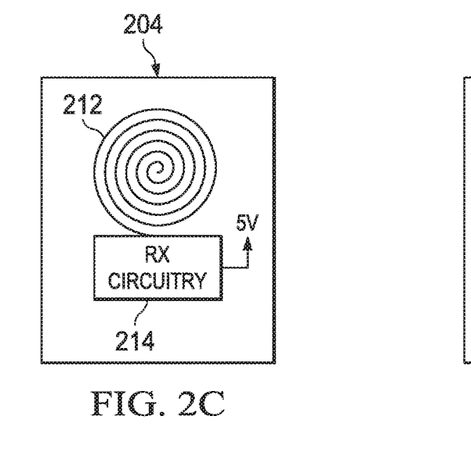
Figure 2D:
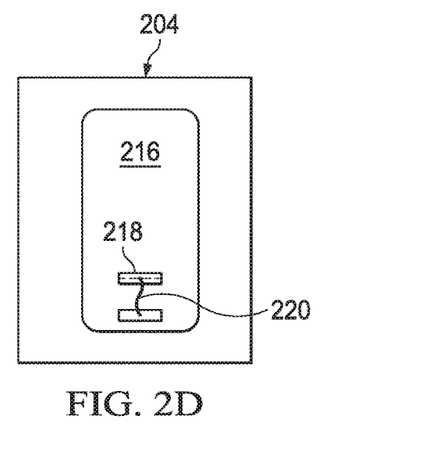

FIGS. 2C and 2D illustrate internal and external views, respectively, of an example embodiment of the receive module 204. The receive module 204 here includes at least one coil 212 for receiving inductively coupled power from the transmit module 202. The receive module 204 also includes receive circuitry 214 for processing the received power and outputting a desired voltage (such as +5V DC or other voltage). The receive circuitry 214 could, for instance, include a rectifier and power conditioning circuitry. The receive module 204 further includes a recess 216 that can receive a wireless headset 208 and a connector 218 (such as a μUSB connector) that can be coupled to the wireless headset 208. Note that the use of the recess 216 is optional. Also, the connector 218 could be fixed, although in the illustrated example the connector 218 is coupled to a retractable cable 220 (such as a USB cable). The use of a retractable cable 220 may help to ease insertion of the connector 218 into the wireless headset 208 and may allow wireless headsets of various configurations to be used with the receive module 204.

Using a system such as that shown in FIG. 2A, the transmit module 202 could represent a "universal" charging transmitter that can provide power to any wireless headset 208 that can be coupled inn the receive module 204. Moreover, the positions of the coils 210*a*-210*b*, 212 in the transmit and receive modules 202-204 can be clearly defined, which can help increase the efficiency of the wireless power transfer between these units.

Figure 3:
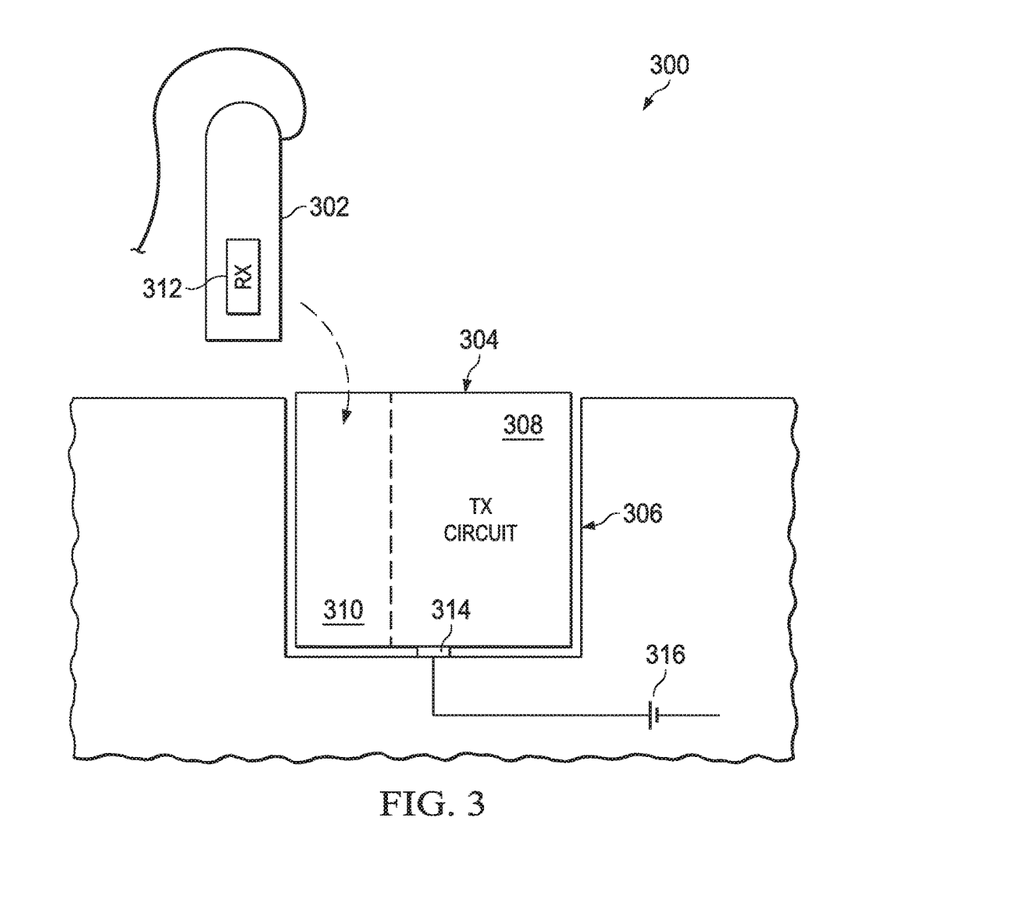
FIGS. 3 through 7 illustrate example systems for charging a wireless headset using a vehicle power supply in accordance with this disclosure.

FIGS. 3 through 7 illustrate example systems for charging a wireless headset using a vehicle power supply in accordance with this disclosure. As shown in FIG. 3, a system 300 includes a wireless headset 302 and a charging unit 304. In some embodiments, the charging unit 304 represents an adapter that can be inserted into an auxiliary or accessory power socket 306 in a vehicle, such as a cigarette lighter holster or similar type of structure. Such a power socket 306 is often generally cylindrical and typically provides a DC supply voltage, such as 12V.

Here, the charging unit 304 includes transmit circuitry 308 and a space 310 into which the wireless headset 302 can be inserted. The transmit circuitry 308 can wirelessly transfer power to receive circuitry 312 located within or otherwise coupled to the wireless headset 302. Power to be provided by the transmit circuitry 308 can be received through an electrical contact 314 in the power socket 306 to a vehicle battery or other power source 316.

In this example, the charging unit 304 could represent a sleeve that is inserted into the power socket 306. In these embodiments, the wireless headset 302 is small enough that it can fit within the space 310, which is inside the power socket 306. However, other embodiments could also be used.

Figure 4:
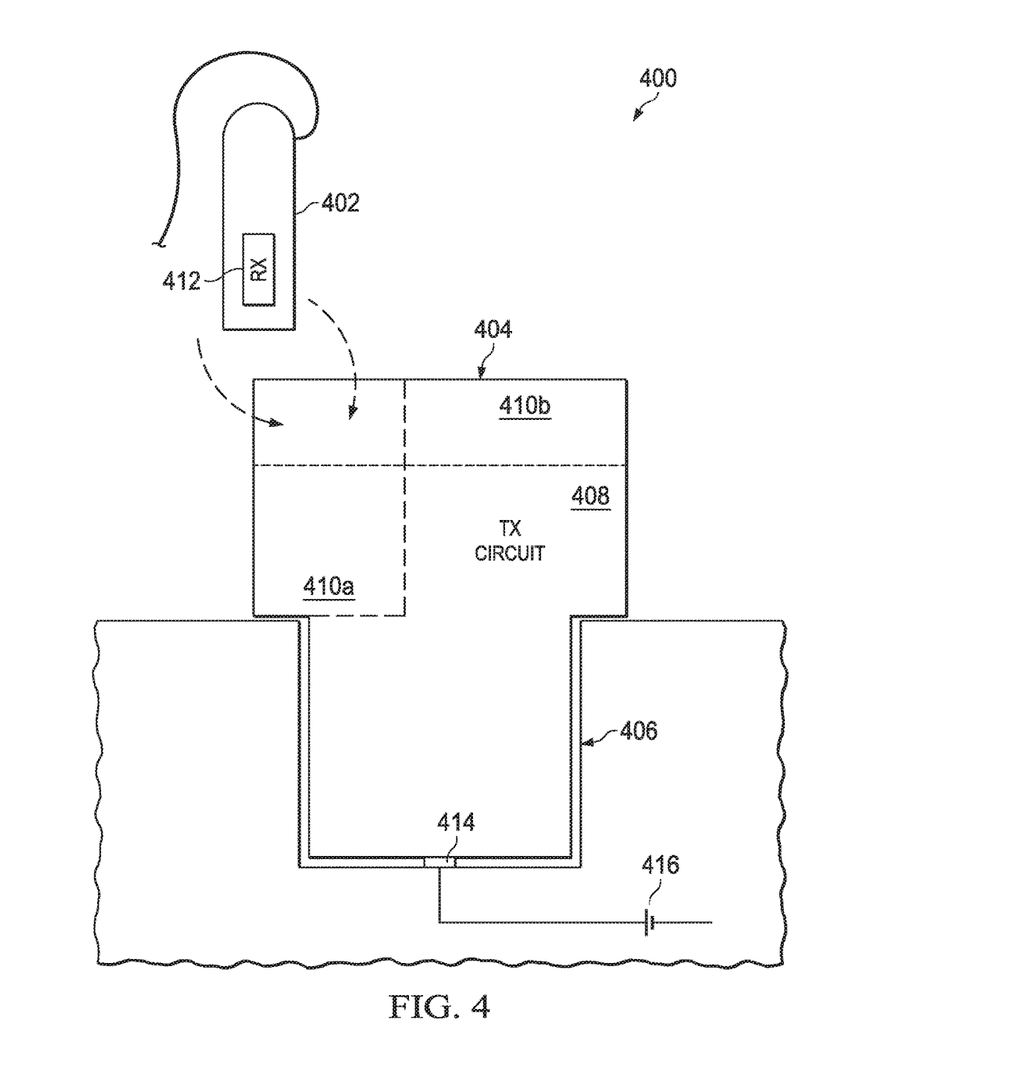

FIG. 4 illustrates a system 400 that includes a wireless headset 402 and a charging unit 404. The charging unit 404 here is similar in operation to the charging unit 304 in FIG. 3. As such, elements 402-416 correspond to similarly numbered elements 302-316 in FIG. 3.

In this example, the charging unit 404 can again be electrically coupled to an electrical contact 414 in an auxiliary or accessory power socket 406, but a space 410*a* or 410*b* for receiving the wireless headset 402 (and possibly transmit circuitry 408) is outside of the power socket 406. In this embodiment, the structure containing the space 410*a* or 410*b* and optionally the transmit circuitry 408 could be physically connected to or form a portion of an adapter that is inserted into the power socket 406. Note that either one of the spaces 410*a*-410*b* could be used, or other types of spaces could be supported for receiving the wireless headset 402. Also note that this approach allows larger headsets to be used with the charging unit 404 (compared to the charging unit 304) since the headset is not required to fit within the power socket 406.

Figure 5:
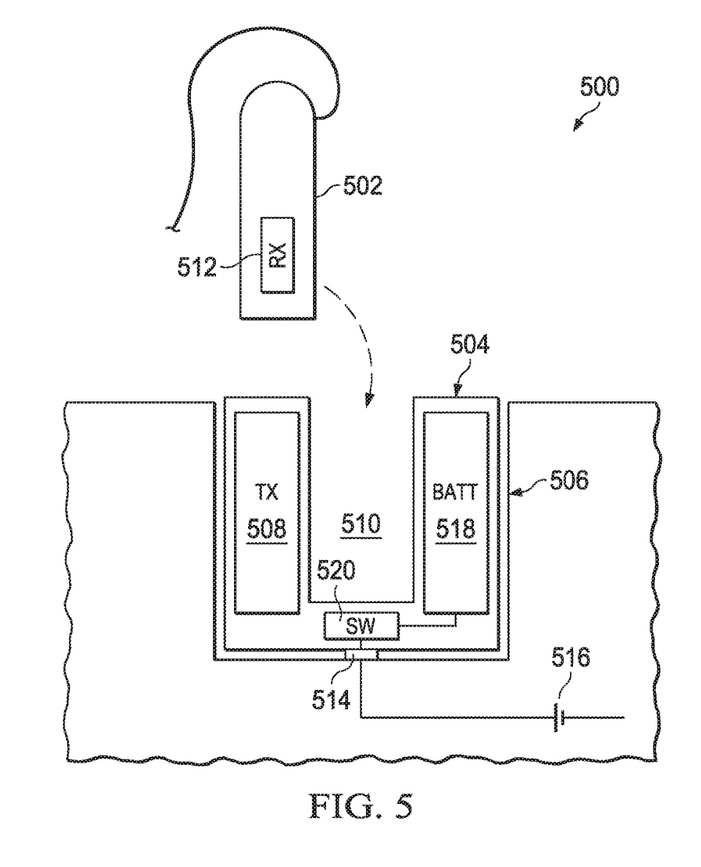

FIG. 5 illustrates a system 500 that includes a wireless headset 502 and a charging unit 504. The system 500 of FIG. 5 is similar to the system 300 of FIG. 3. The system 500 includes a wireless headset 502 and a charging unit 504. In some embodiments, the charging unit 504 represents an adapter that can be inserted into an auxiliary or accessory power socket 506 in a vehicle. The charging unit 504 includes transmit circuitry 508 and a space 510 into which the wireless headset 502 can be inserted. The transmit circuitry 508 can wirelessly transfer power to receive circuitry 512 located within or otherwise coupled to the wireless headset 502.

Power to be provided by the transmit circuitry 508 can be received through an electrical contact 514 in the power socket 506 to a vehicle battery or other power source 516.

Power to be provided by the transmit circuitry 508 can also be received from an internal power supply 518, such as a lithium ion battery or other battery or source or power. Power can be routed from the electrical contact 514 or from the internal power supply 518 to the transmit circuitry 508 using a switch 520. Power could also be routed from the electrical contact 514 to the internal power supply 518 using the switch 520 in order to recharge the internal power supply 518.

In this embodiment, the charging unit 504 could be used to charge the wireless headset 502 even when power from the power source 516 is unavailable. This may occur, for instance, when the vehicle is turned off or when the charging unit 504 has been physically removed or disconnected from the power socket 506. This allows the charging unit 504 to be used in many different locations, both inside and outside of a vehicle.

Note that the modification shown in FIG. 4 or a similar modification could also be used in FIG. 5. For instance, elements 508-510 and 518-520 could reside outside of the power socket 506, such as in a larger portion of an adapter that is plugged into the power socket 506.

Figure 6:
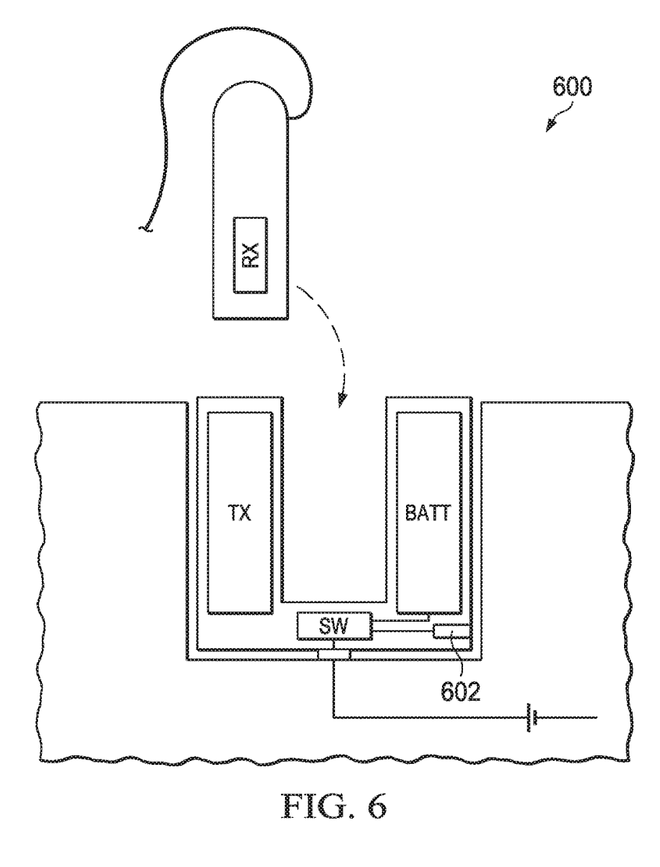

FIG. 6 illustrates a system 600 that is similar to the system 500 of FIG. 5. However, the system 600 includes at least one additional port 602 in the charging unit. The port 602 could represent any suitable port for coupling to one or more external devices or signal lines. In some embodiments, the port 602 represents a USE or μUSB port. The port 602 can be used, for instance, to receive power from an external source to charge the internal power supply or to provide power to the transmit circuitry. The port 602 could also be coupled to an external device and used to provide power to the external device, such as to power or charge the external device. Once again, note that the modification shown in FIG. 4 or a similar modification could also be used in FIG. 6. Also note that one or multiple ports of any suitable type(s) could be used.

Figure 7:
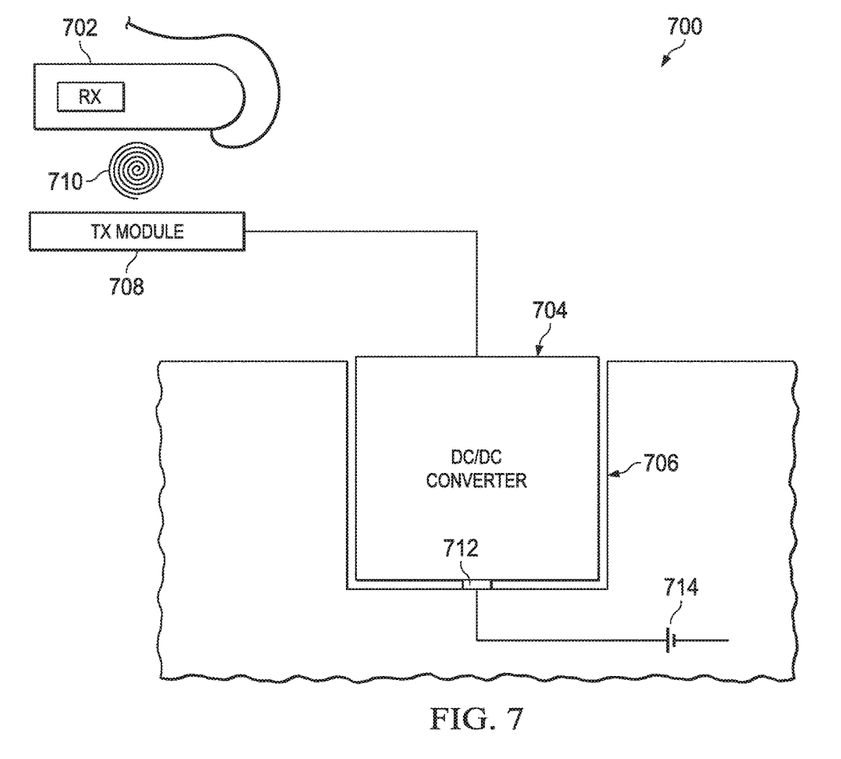

FIG. 7 illustrates a system 700 that includes a wireless headset 702 and a charging unit 704. In some embodiments, the charging unit 704 represents an adapter that can be inserted into an auxiliary or accessory power socket 706 like a cigarette lighter holster in a vehicle. The charging unit 704 includes a DC/DC converter that converts an input DC voltage into an output DC voltage, such as by converting a +12V DC input voltage into a +5V DC output voltage. The DC output voltage is provided to a transmit module 708, which generates a magnetic field 710 that inductively couples power from the transmit module 708 to a receive module located within or otherwise coupled to the wireless headset 702. The charging unit 704 receives power through an electrical contact 712 in the power socket 706 to a vehicle battery or other power source 714.

The charging unit 704 could include features in addition to a DC/DC converter. For example, the charging unit 704 could incorporate a rechargeable or other internal power supply, such as one or more rechargeable batteries. The charging unit 704 could also include one or more USB, μUSB, or other ports. The transmit unit 708 could also have various forms. For instance, the transmit unit 708 could represent a pad, mat, or tray on or in which the wireless headset 702 (and possibly a mobile telephone or other device) can be placed.

Note that in embodiments where a receive coil is embedded within a wireless headset or even in a dongle coupled to a wireless headset, it may be difficult to properly align the receive coil with an external transmit coil. Ideally, the transmit and receive coils are planar and parallel to each other. However, due to various factors (such as the shape of a wireless headset or the amount of available space in a wireless headset), the alignment between the coils may be poor. This can negatively affect inductive coupling and power transfer, namely by decreasing the inductive coupling between the coils.

To help compensate for this problem, it is possible to use multiple receive coils, one or more within a wireless headset and one or more outside of the wireless headset. For example, a larger receive coil could reside outside of the wireless headset and act like a transformer to inductively couple power into a smaller receive coil inside the wireless headset. In effect, power is wirelessly transferred twice, once from the transmit coil to the larger receive coil (called a "coupler") and once from the larger receive coil to the smaller receive coil.

Figure 8A:
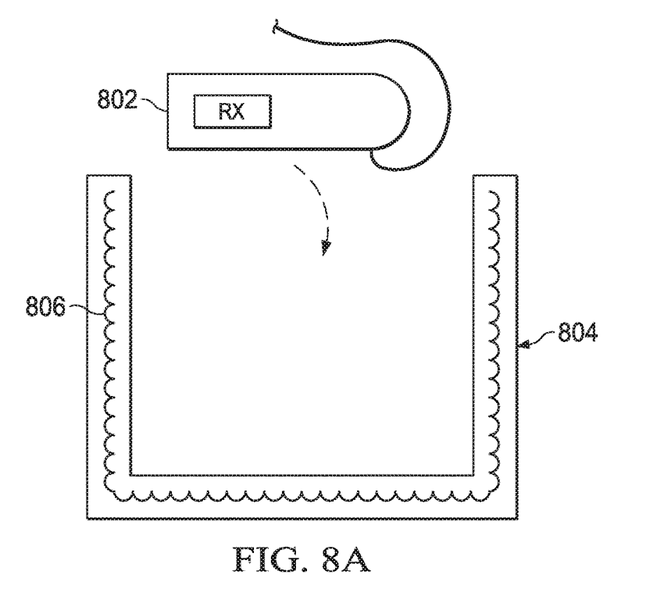
FIGS. 8A and 8B illustrate an example system for charging a wireless headset using a cup in accordance with this disclosure.

FIGS. 8A and 8B illustrate an example system 800 for charging a wireless headset using a cup in accordance with this disclosure. As shown in FIG. 8A, a wireless headset 802 containing or coupled to receive circuitry can be inserted into a cup 804, which represents any suitable receptacle into which the wireless headset can be placed. The cup 804 could have any suitable size, shape, and dimensions, such as a cylindrical shape. The cup 804 includes at least one coil 806.

Figure 8B:
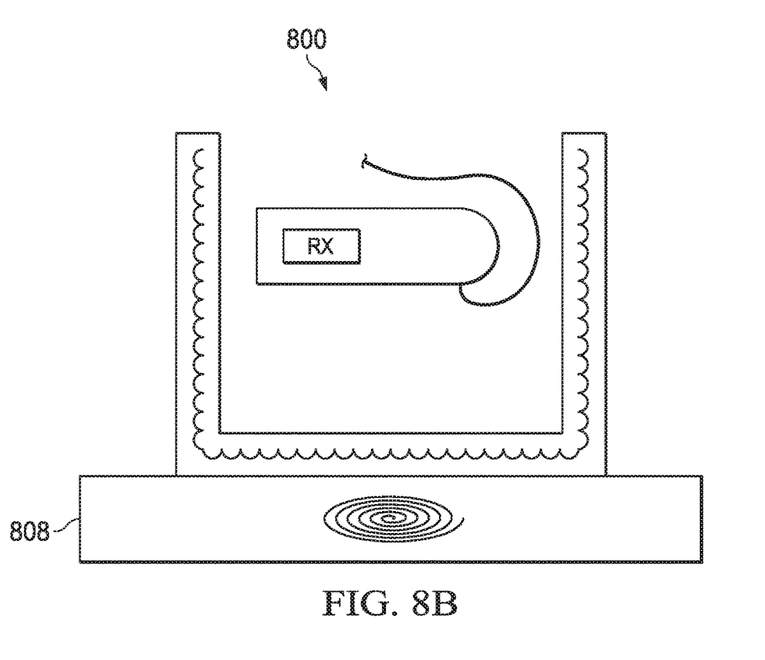

As shown in FIG. 8B, the cup 804 is placed in proximity to a transmit module 808 having at least one transmit coil that can inductively couple power into the receive coil 806 of the cup 804. The receive coil 806 of the cup 804 can then inductively couple power into the receive coil of the wireless headset 802.

The design of the receive coil 806 within the cup 804 can provide headset designers with much more flexibility in terms of designing a headset with an internal receive coil. For example, a designer may not be constrained to placing an internal receive coil on a planar surface. Also, since the wireless headset 802 can be placed in a number of orientations within the cup 804, a user could simply drop the wireless headset 802 into the cup 804 and achieve sufficient coupling to permit recharging of the headset 802.

Note that the cup 804 and the transmit module 808 could be used or integrated into any suitable environment, such as a vehicle. For example, the cup 804 could represent or form part of a cupholder in a vehicle, or the cup 804 could represent a structure that can be inserted into (and possibly removed from) a cupholder in a vehicle. The transmit module 808 could be installed or otherwise placed below the vehicle cupholder, and the transmit module 808 could operate continuously or in an intermittent (controlled) manner.

Also note that power to the coil(s) 806 in the cup 804 need not be delivered wirelessly. For example, the cup 804 could incorporate transmit circuitry that uses the coil(s) 806 to transmit power, and the transmit circuitry could receive power from an external source (such as a vehicle battery). This could allow, for instance, the cup 804 to be wired directly to a power distribution system in a vehicle, possibly used as a cupholder in the vehicle.

Figures 9A, 9B:
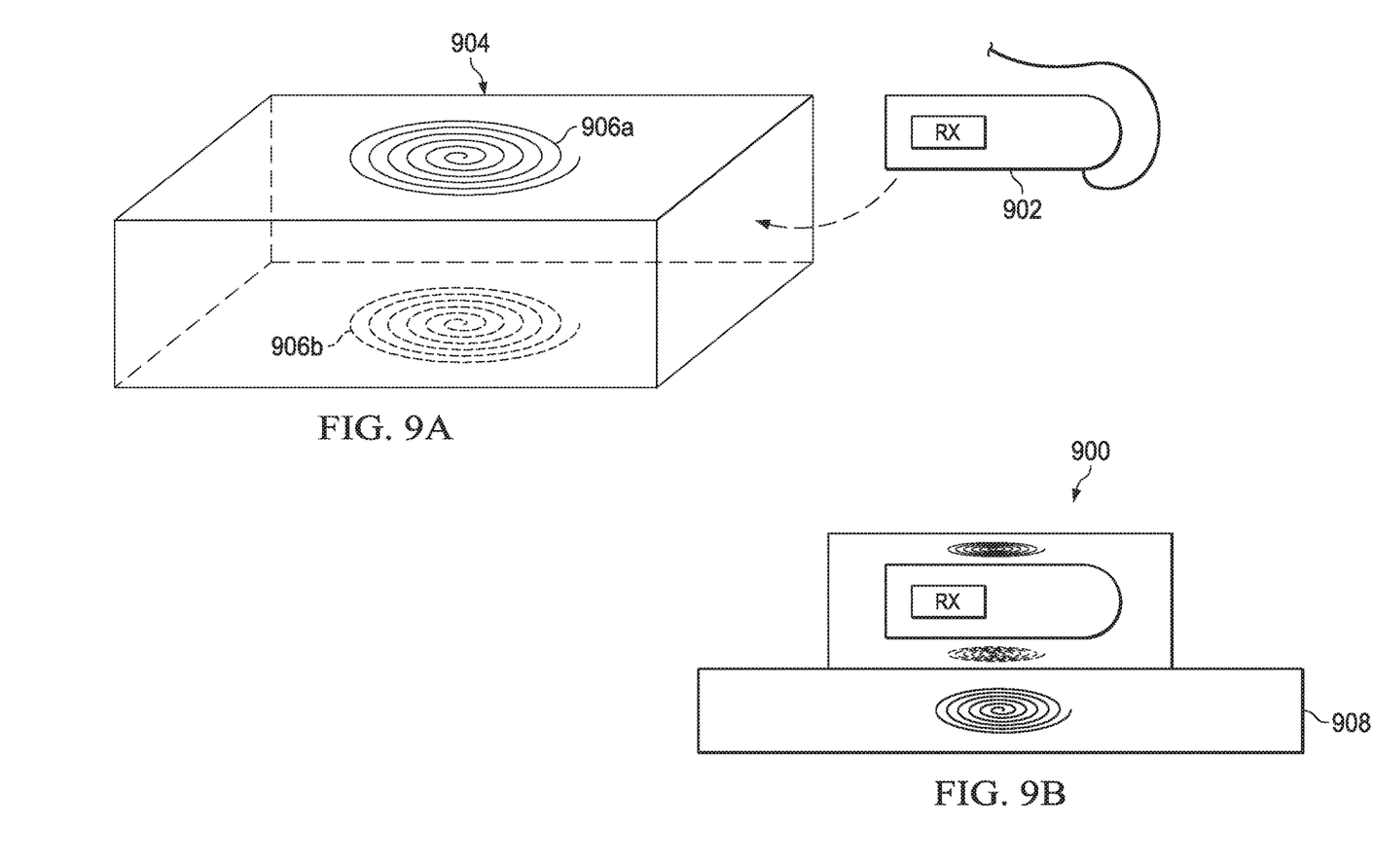
FIGS. 9A and 9B illustrate an example system for charging a wireless headset using a protective enclosure in accordance with this disclosure.

FIGS. 9A and 9B illustrate an example system 900 for charging a wireless headset using a protective enclosure in accordance with this disclosure. As shown in FIG. 9A, a wireless headset 902 associated with receive circuitry can be inserted into a sleeve 904, which includes one or more coils 906a-906b. In some embodiments, the sleeve 904 could represent a case designed to protect the wireless headset 902, and coils 906a-906b can be placed on top and bottom of the sleeve 904.

As shown in FIG. 9B, the system 900 includes the sleeve 904 and a transmit module 908 having at least one transmit coil that can inductively couple power into one or both of the receive coils 906a-906b of the sleeve 904. The receive coil(s) 906a-906b of the sleeve 904 can then inductively couple power into the receive coil of the wireless headset 902. Again, this provides a greater degree of freedom in terms of designing the internal receive coil of the wireless headset 902.

Note that while various embodiments of devices and systems for contactless charging of wireless headsets have been shown and described above, various changes may be made to these devices and systems. For example, features from one or more of the figures above could be used in other figures above. As a particular example, a dongle physically coupled to a wireless headset could be used in FIGS. 3 through 9B, such as when the dongle is inserted into a charging unit, cup, or sleeve. Also, the number of components in each figure and the arrangement of those components are for illustration only. A device could include any number of its illustrated components, and a system could include any number of its illustrated components. In addition, each component in the figures could be formed from any suitable material(s) and in any suitable manner.

It may be advantageous to set forth definitions of certain words and phrases that have been used within this patent document. The term "couple" and its derivatives refer to any, direct or indirect communication between components, whether or not those components are in physical contact with each other. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus suitable for wireless charging, comprising:
   a wireless charging adapter dimensioned for insertion into a powered vehicle receptacle, including
      an adapter electrical contact to receive vehicle power when the charging adapter is inserted into a powered vehicle receptacle,
      a charging space dimensioned to receive a wireless headset,
      transmit circuitry coupled to the adapter electrical contact and including a transmit coil, operable to inductively transmit wireless power through the transmit coil into the charging space, transmit circuitry including a DC-DC converter to convert a direct current (DC) voltage received through the adapter electrical contact into a DC charging voltage to power the transmit circuitry,
      an internal power supply to store power, and
      switch circuitry to
         selectively couple the adapter electrical contact to one of the transmit circuitry and the internal power supply, and
         selectively couple the transmit circuitry and the internal power supply.

2. The apparatus of claim 1, wherein the wireless charging adapter further includes a port to at least one of:
   receive power from an external device to charge the internal power supply;
   provide power from an external device to the transmit circuitry; and
   provide power from the internal power supply to an external device.

3. The apparatus of claim 1, wherein the powered vehicle receptacle includes a receptacle electrical contact to contact the adapter electrical contact when the wireless charging adapter is inserted into a powered vehicle receptacle.

4. The apparatus of claim 3, wherein the powered vehicle receptacle is a cup holder adapted as a powered vehicle receptacle including the receptacle electrical contact.

5. The apparatus of claim 1, wherein the transmit circuitry is operable to inductively transmit wireless power through the transmit coil when the wireless headset is inserted into the charging space.

6. The apparatus of claim 1, wherein the switch circuitry is adapted to
   selectively couple the adapter electrical contact to one of the transmit circuitry and the internal power supply to receive power from the adapter electrical contact, when the charging adapter is inserted into the powered vehicle receptacle, and
   selectively couple the transmit circuitry to receive power from the internal power supply, when the charging adapter is not inserted into the powered vehicle receptacle.

7. An apparatus suitable for wirelessly charging a wireless headset from a powered vehicle receptacle that includes a receptacle electrical contact coupled to a vehicle power supply, comprising:
   a wireless charging adapter dimensioned for insertion into the powered vehicle receptacle, including
      an adapter electrical contact to receive vehicle power when the charging adapter is inserted into the powered vehicle receptacle,
      a charging space dimensioned to receive the wireless headset,
      transmit circuitry coupled to the adapter electrical contact and including a transmit coil, operable to inductively transmit wireless power through the transmit coil into the charging space, the transmit circuitry including a DC-DC converter to convert a direct current (DC) input voltage received through the adapter electrical contact into a DC charging voltage to power the transmit circuitry,
      an internal power supply to store power, and
      switch circuitry to
         selectively couple the transmit circuitry and the internal power supply to receive power from the adapter electrical contact, when the charging adapter is inserted into the powered vehicle receptacle, and
         selectively couple the transmit circuitry to receive power from the internal power supply, when the charging adapter is not inserted into the powered vehicle receptacle.

8. The apparatus of claim 1, wherein the wireless charging adapter further includes a port to at least one of:
   receive power from an external device to charge the internal power supply;

provide power from an external device to the transmit circuitry; and provide power from the internal power supply to an external device.

9. The apparatus of claim 1, wherein the powered vehicle receptacle includes a receptacle electrical contact to contact the adapter electrical contact when the wireless charging adapter is inserted into a powered vehicle receptacle.

10. The apparatus of claim 3, wherein the powered vehicle receptacle is a cup holder adapted as a powered vehicle receptacle including the receptacle electrical contact.

\* \* \* \* \*